(12) United States Patent
Chao

(10) Patent No.: US 6,744,551 B1
(45) Date of Patent: Jun. 1, 2004

(54) METHOD AND APPARATUS FOR EMPLOYING ELECTROOPTIC MATERIALS SUBJECT TO OPTICAL DAMAGE AS A MEDIUM FOR CONTROL OF LIGHT BEAM ATTRIBUTES USING ELECTRODE-GENERATED ELECTRIC FIELDS

(76) Inventor: Yong-Sheng Chao, 141 Davis Rd., Storrs, CT (US) 06268

( * ) Notice: Subject to any disclaimer, the term of this patent is extended or adjusted under 35 U.S.C. 154(b) by 0 days.

(21) Appl. No.: 10/269,230

(22) Filed: Oct. 11, 2002

Related U.S. Application Data

(63) Continuation-in-part of application No. 09/812,055, filed on Mar. 19, 2001, now Pat. No. 6,473,246, which is a continuation-in-part of application No. 09/737,506, filed on Dec. 15, 2000, now Pat. No. 6,295,171, which is a continuation-in-part of application No. 09/503,828, filed on Feb. 15, 2000, now Pat. No. 6,204,955, which is a continuation-in-part of application No. 09/350,388, filed on Jul. 9, 1999, now abandoned.

(51) Int. Cl.$^7$ .......................... G02B 26/08; G02F 1/29; G02F 1/03; G02F 1/07
(52) U.S. Cl. .................. 359/298; 359/245; 359/249
(58) Field of Search ................. 359/298, 245, 359/251–255, 237, 247, 269, 271, 315, 322, 249, 244, 299; 345/107–108, 105; 430/35

(56) References Cited

U.S. PATENT DOCUMENTS 5,898,720 A * 4/1999 Yamamoto et al. ........... 372/39
6,101,203 A * 8/2000 Yamamoto et al. ........... 372/39
6,137,601 A   10/2000 Khoury et al.

OTHER PUBLICATIONS

Chen et al., "Light Modulation and Beam Deflection with Potassium Tantalate–Niobate Crystals," Journal of Applied Physics, vol. 37, pp. 388–398.

* cited by examiner

*Primary Examiner*—Hung Xuan Dang
*Assistant Examiner*—Joseph Martinez
(74) *Attorney, Agent, or Firm*—Altman & Martin

(57) ABSTRACT

A method and apparatus for dynamically controlling variation in an attribute of a light beam employing materials with unusually high electrooptical coefficients that are subject to optical damage from the light beam being controlled. The method includes providing a transmission medium composed of a high sensitivity electrooptic material transparent to the light beam and having a nonzero electrooptic coefficient, where the medium is adapted to receive, propagate, and output the light beam. The medium is subjected to an electric field, the strength of which is controlled to determine the amount of variation of the light beam attribute. The field is generated by electrodes appropriately enclosing the medium and inducing a voltage across the electrodes. The medium is illuminated by a suppressing light source, the illumination being intense enough to significantly reduce charge distribution inhomogeneity within the medium. The intensity of the suppressing illumination is at least twice the intensity of the light beam being controlled.

4 Claims, 1 Drawing Sheet

METHOD AND APPARATUS FOR EMPLOYING ELECTROOPTIC MATERIALS SUBJECT TO OPTICAL DAMAGE AS A MEDIUM FOR CONTROL OF LIGHT BEAM ATTRIBUTES USING ELECTRODE-GENERATED ELECTRIC FIELDS

CROSS-REFERENCES TO RELATED APPLICATIONS

The present application is a continuation-in-part application of application Ser. No. 09/812,055, dated Mar. 19, 2001 now U.S. Pat. No. 6,473,246, for ELECTROOPTIC LIGHT BEAM DEFLECTOR, in the name of Yong-Sheng Chao, which is a continuation-in-part application of application Ser. No. 09/737,506, dated Dec. 15, 2000, for PIEZOELECTRIC LIGHT BEAM DEFLECTOR in the names of Yong-Sheng Chao and Ying Zhao, now U.S. Pat. No. 6,295,171, which is a continuation-in-part application of application Ser. No. 09/503,828, dated Feb. 15, 2000, for APPARATUS FOR DYNAMIC CONTROL OF LIGHT DIRECTION IN A BROAD FIELD OF VIEW in the names of Yong-Sheng Chao and Ying Zhao, now U.S. Pat. No. 6,204,955, which is a continuation-in-part application of application Ser. No. 09/350,388, dated Jul. 9, 1999 now abandoned, for APPARATUS FOR DYNAMIC CONTROL OF LIGHT DIRECTION IN A BROAD FIELD OF VIEW in the names of Yong-Sheng Chao and Ying Zhao.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

This invention relates generally to electrooptic materials and real-time electrooptic devices and more particularly, to techniques for reducing or eliminating optical damage effects in electrooptic materials so they can be used to effectively control, with electric signals, attributes of a light beam traversing the material.

2. Description of the Related Art

From an application perspective, there are two types of electrooptic effects: direct and indirect. The direct electrooptic effect is the change of index of refraction of an optical transmission medium induced by an electric field that is directly controlled by an electric voltage signal applied on a pair of electrodes enclosing the medium. The indirect electrooptic effect involves the change of index of refraction induced by electric field that is generated by a nonelectric process, such as by light illumination, as in a photorefractive process. It has been established that, in a photorefractive process, a light beam can cause a redistribution of the electrons and ions, hence creating a non-uniform internal electric field in the medium. Such a non-uniform internal electric field also causes changes of refractive index, affecting the light propagation inside the medium. The goal of photorefractive research efforts and photorefractive application devices has been to find a way to utilize the non-uniform distribution of the index of refraction induced by incident light beams. Thus, even though in the photorefractive process, indirect electrooptic effects constitute an important contributing factor, the photorefractive process and the direct electrooptic effects are two essentially different physical processes. The most important differences are that (1) the photorefractive process is a light-light interaction process, while the direct electrooptic process is control of a light beam through an external electric field, and (2) in physical implementations, the photorefractive process involves electrodeless electrooptic effects, whereas, for direct electrooptic effects, there must be at least a pair of electrodes to generate the electric field.

Direct electrooptic effects have been used for the construction of light beam deflectors, modulators, spectral filters, optical switches, multiplexers, and optical computing devices. According to convention, the phrase, "electrooptic device," is used solely for those devices that utilize the direct electrooptic effect, while for the devices involving indirect electrooptic effects, substantially different terminologies are used, such as those used in photorefractive devices. Thus, unless noted otherwise, the present specification uses the terms, "electrooptic effects" and "electrooptic devices," to indicate the physical process involving direct electrooptic processes.

For practical applications of the direct electrooptic effects, one of the most important requirements for an electrooptic material is a high electrooptic coefficient. As is well known, when an electric field is applied to an appropriate electrooptic material in the appropriate direction, the change of the index of refraction is $$n(E)-n(0)=a_1 E+(\tfrac{1}{2})a_2 E+ \quad (1)$$

where $n(E)-n(0)$ is the change in the index of refraction due to the electric field E, and $a_1, a_2, \ldots$, are the first order and second order electrooptic coefficients for the material. According to general convention, Equation (1) can also be written as $$n(E)-n(0)=(\tfrac{1}{2})n(0)^3 \cdot r \cdot E + (\tfrac{1}{2})n(0)^3 \cdot R \cdot E^2 \quad (2)$$

where r and R are first order and second order electrooptic coefficients, respectively, and are generally complex high-rank tensors. Note that, for the construction of direct electrooptic devices, a critically important difficulty is the fact that for all known electrooptic materials, electrooptic coefficients are very small. For example, in the prior art, the best and the most popular electrooptical materials for direct electrooptic devices are the crystals ADP, KDP ($KH_2PO_4$), lithium niobate ($LiNbO_3$), and lithium tantalate ($LiTaO_3$). Lithium niobate may be considered as having the largest linear electrooptical coefficient among all the qualified materials. Lithium niobate has a linear electrooptic coefficient $r_{33}=35.8$ pm/V, or $35.8 \times 10^{-6}$ mm/kV. When electric field E is as strong as 1 kV/mm, the change in the index of refraction is only approximately $1.85 \times 10^{-4}$, which is too small for many potential applications.

On the other hand, some materials have been found that exhibit much larger electrooptic coefficients. Certain single crystal materials, such as SBN ($Sr_{1-x}Ba_xNb_2O_6$, where x is the percentage composition, in the range of $0.25<x<0.75$), have an electrooptic coefficient 30 to 100 times larger than that of the above-identified materials. In the present specification, these materials with unusually large electrooptic coefficients are called "high sensitivity electrooptic materials," in contrast to the conventional electrooptic materials of the prior art, which are called "low sensitivity electrooptic materials." There is no clear demarcation line for differentiating the high sensitivity from the low sensitivity electrooptic materials. However, high sensitivity electrooptic materials may be roughly defined as those materials that have an electrooptic coefficient at least five times greater than that of the average coefficient of conventional electrooptic materials.

In the 1960s, it was found that the incident light, the light whose attributes are being intentionally modified by applying a voltage signal to the electrodes through direct electrooptic effects, causes these high-sensitivity electrooptic crystals to incur a kind of internal "optical damage." Optical damage is a phenomenon that, under light illumination, the index of refraction of an originally homogeneous crystal material becomes spatially inhomogeneous. It was also found that the optical damage becomes apparent only after illumination over a relatively extended period of time, measured in seconds or greater. As a consequence of the optical damage, when a light beam passes through such a material, the well-behaved incident light beam becomes severely distorted. Because of this effect, all materials vulnerable to optical damage effects were effectively excluded from use for control of incident light beam attributes through direct electrooptic effects.

In recent years, the underlying cause of optical damage in electrooptic materials has been essentially explained. It was discovered that the light-induced change of the index of refraction is due to the light-induced redistribution of electric charge inside the material. A light-induced inhomogeneous electric charge distribution inside the material produces a strong inhomogeneous internal electric field which, in turn, causes an inhomogeneous distribution of index of refraction.

As indicated, those materials having the most pronounced optical damage have been excluded from use for control of incident light beam attributes through use of direct electrooptic effects because of the severe detrimental effects caused by the incident light beam. Unfortunately, those electrooptic materials with severe optical damage are often the best direct electrooptic materials because they have the largest electrooptic coefficients, which is by far the most important property.

BRIEF SUMMARY OF THE INVENTION

The object of the present invention is to provide a method and device for reducing or eliminating optical damage in high sensitivity electrooptic materials so that they can be employed in the dynamic control of light beam attributes.

The present invention provides an effective means for reducing or eliminating the optical damage effects so that high sensitivity electrooptic materials can be used in direct electrooptic processes, specifically, the dynamic control of an attribute of an incident light beam. Briefly, the present invention is a method for dynamically controlling variation in an attribute of a light beam. The method includes providing a transmission medium composed of a high sensitivity electrooptic material transparent to the light beam and having a nonzero electrooptic coefficient, where the medium is adapted to receive, propagate, and output the light beam. The medium is subjected to an electric field, the strength of which is controlled to determine the amount of variation of the light beam attribute. The medium is illuminated by a suppressing light source, the illumination being intense enough to significantly reduce charge distribution inhomogeneity within the medium.

A light beam enters a transmission medium that is transparent to the light beam. The beam propagates through the medium, and exits as an output light beam with a particular attribute changed. The attribute that is controlled is determined by the medium itself, and may be the direction of the light beam, the intensity of the light beam, or another attribute. The amount of change of the attribute is determined by the strength of an electric field generated by a pair of electrodes. The voltage across the electrodes is controlled to determine the amount of attribute change.

A suppressing light source illuminates the transmission medium with an intensity sufficient to suppress the inhomogeneous charge distribution induced by the light beam being controlled. The intensity of the suppressing illumination must be larger than that of the incident light beam, typically by a factor of from 2 to a relatively large number such as 1,000. Since there is not restriction on the other parameters of the suppressing illumination, low-cost conventional light sources such as light-emitting diodes (LEDs) and incandescent lamps can be used.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
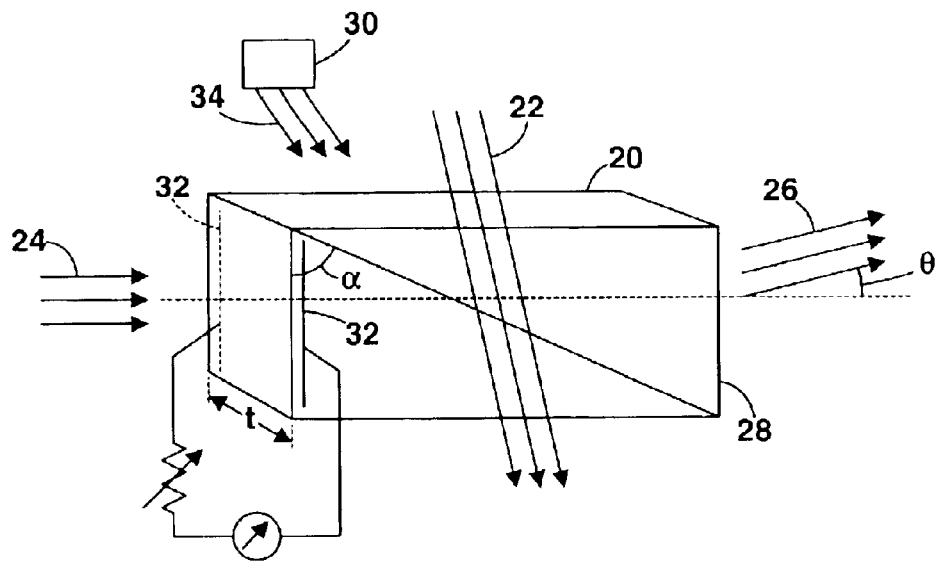
FIG. 1 is a diagram of a light direction controller employing a suppressing light source.

As indicated above, there are a number of materials that exhibit extraordinarily large electrooptic effects, the so-called high sensitivity electrooptic materials. These materials should be the most desired candidates for applications utilizing the direct electrooptic effects. However, the materials that exhibit the largest electrooptic coefficients, making them the most useful, also tend to be the most sensitive to optical damage. Thus, in order to utilize the useful direct electrooptic effects of these materials, a means must be employed to reduce or eliminate the optical damage effects. The present invention provides an effective means for reducing or eliminating the optical damage effects so that these high sensitivity electrooptic materials can be used in direct electrooptic processes, specifically, the dynamic control of an attribute of an incident light beam.

In the present specification, the term "dynamic control" refers to the ability to vary a given attribute of a light beam very quickly, on the order of microseconds. For example, if the direction of a light beam needs to be changed, the appropriate signal is applied to the electrooptic material, which causes the direction to change within microseconds. This is in contrast to the photorefractive effect, which is not a fast enough "dynamic" effect, but takes place and becomes evident over a period of seconds or more.

The basic approach of the present invention is to use a high sensitivity electrooptic material as a normal electrooptic material and, at the same time, provide effective measures to eliminate or reduce the undesired inhomogeneous redistribution of electric charge in these materials by using a suppressing light source.

The present invention uses an additional light source with a sufficient light intensity to suppress the inhomogeneous redistribution of light-induced electric charge inside the material. The theoretical basis, and the underlying physical mechanism responsible for ensuring the material's internal homogeneity through additional intense light illumination, is to increase the photoconductivity of the material. The photoconductivity of a material is generally proportional to the intensity of illumination. With an increase in photoconductivity, the tendency to accumulate inhomogeneous local electric charge is substantially reduced. In fact, when the conductivity of a material is very large, such as that of metallic materials, no internal inhomogeneous charge distribution can exist at all. The reason is that, if such a local electric charge did exist, it would create an electric field, generating a current that is proportional to the conductivity of the material. Because of the increased photoconductivity, the large current, in return, leads to substantially reduced or eliminated inhomogeneity of charge distribution. The higher the illumination intensity, the higher the photoconductivity of the material and the faster and the more the local inhomogeneous charge accumulation will disappear.

The following are some typical applications for using the direct electrooptic effect to dynamically control light beam attributes, and how the optical damage can be eliminated in real time under the specific configurations for a light beam deflector.

One application is to use direct electrooptic effects to vary the direction of a light beam. There are a number of ways of doing so, and they have two common features: there must be an electrooptic material and there must be at least one pair of electrodes. A basic light direction controller is shown in FIG. 1. Typically, an electric field 22 generated by an electrode pair 32 is applied to at least a section of a prism sheet 20 having a triangular or parallelepiped shape of electrooptic material that is transparent to the incident light 24. The incident light beam 24, having its electric vector along an appropriately chosen polarization direction, enters the sheet 20, propagates through the sheet 20, and becomes a deflected output light beam 26 at the opposite surface 28. If the apex angle of the prism is $\alpha$, the thickness of the sheet 20 enclosed by the electrode pair 32 is t, the appropriate electrooptic coefficient is r, and the amplitude of the voltage signal is V, then the deflection angle $\theta = -(\frac{1}{2})\alpha r n^3 (V/t)$ (see, for example, B. Saleh et al., Fundamentals of Photonics, p.775 (1991)).

Figure 2:
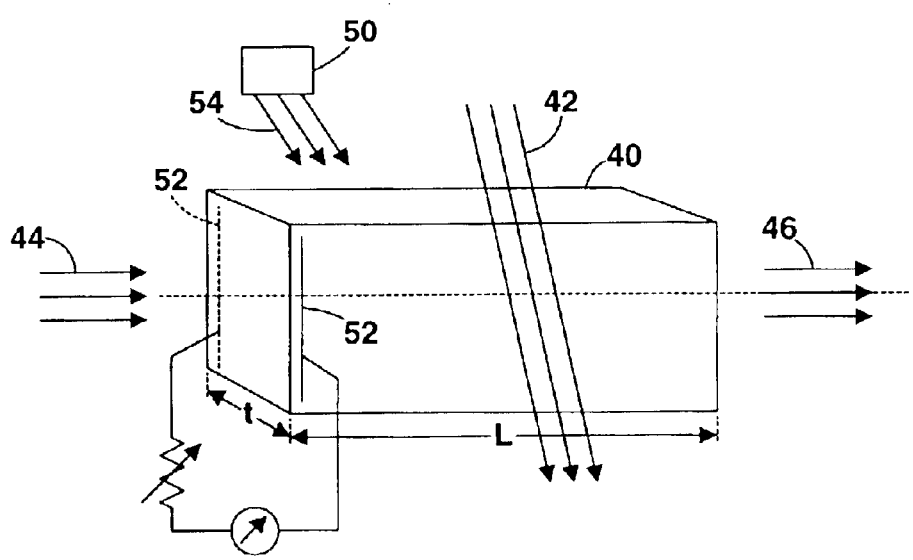
FIG. 2 is a diagram of a light modulator employing a suppressing light source.
Figure 3A:
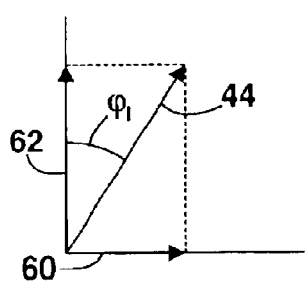
FIG. 3 is a graphical representation of how an anisotropic material shifts the phase of an incident light beam.
Figure 3B:
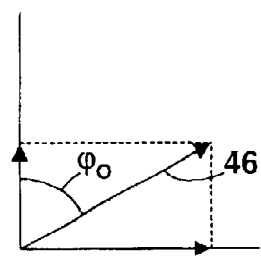

Another application is to use direct electrooptic effects for light modulation, as in FIG. 2. As is well known, in an anisotropic crystal medium 40, polarized incident light 44 is internally split into two mutually perpendicular polarization components. The ordinary wave 60 has an index of refraction $n_o$ and the extraordinary wave 62 has an index of refraction $n_e$, where generally $n_o \neq n_e$. Since the two components have different indices of refraction, they propagate with different phase speeds. Assuming the incident light 44 has a phase angle $\phi_I$ and the exiting light beam 46 has a phase angle of $\phi_O$, upon exiting the medium 40, the light beam 46 is rotated by $\Delta\phi = \phi_O - \phi_I$, as shown in FIGS. 3A and 3B.

When an electric field 42 generated by an electrode pair 52 is applied to the medium 40, a relative change of the difference $n_o$ and $n_e$ is induced. Assuming the typical case where the electric field 42 is transversely applied to the medium 40, that is, the direction of the electric field 42 is perpendicular to the incident light 44 propagation direction, the phase difference between the ordinary wave 60 and the extraordinary wave 62 is $$\Delta\phi = (\pi/\lambda) \cdot r n^3 \cdot L \cdot (V/t) \qquad (3)$$

where r is an appropriate electrooptic coefficient, $\lambda$ is the wavelength of the light, L is the light path length inside the medium 40, V is the voltage of the electric signal applied to the electrodes 52, and t is the thickness of the sheet 40 across which the electric field 42 is applied. Generally, a pair of polarizers is placed to sandwich the electrooptic modulator so that any significant change of relevant measurable quantities can be detected. A retardation phase change of 0, $\pi/2$, $\pi$, ..., between the ordinary wave 60 and the extraordinary wave 62 corresponding to the voltage of the applied electric field 42 is induced, so that the intensity of the output light beam 46 undergoes a significant change after passing through the last polarizer.

Note that it is not an object of the present invention to provide any specific electrode geometry configuration or any specific geometry configuration for the medium of the modulator, but to provide an effective means for eliminating the detrimental optical damage effects to all the modulator devices governed by the physical process of direct electrooptic effects. The modulation device can be built as an amplitude modulator, a phase modulator, or a wavelength selector. Currently, the prior art discloses numerous geometry configurations for constructing a light modulator to which the present invention can be applied, including transverse, longitudinal, single layer, multilayer, and non-planar. As with the direction control application described above, the modulation applications must have two features in common: there must be an electrooptic material and there must be at least one pair of electrodes.

FIG. 1 illustrates a basic configuration of a hardware embodiment for a direct electrooptic system electrooptic with suppressing light illumination. A light beam 24 having its electric vector along an appropriately chosen polarization direction enters the transmission medium 20, propagates through the medium 20, and exits the medium 20 as an output light beam 26 with its direction changed. The amount of change in direction is determined by the strength of a controlled electric field 22 generated by a pair of electrodes 32. The strength of the electric field is determined by the amplitude of the voltage signal applied across the electrodes 32. The voltage amplitude is controlled to obtain the desired change in direction. The polarization direction of the electric field vector of the light beam 24 must have a strict specific relationship with the direction of the axis of symmetry of the specific crystal material used as the transmission medium 20. Such a relationship is standard practice and is well-documented in the prior art. A suppressing light source 30 with a variety of possible spatial and/or temporal configurations illuminates the transmission medium 20. The intensity of the suppressing illumination 34 must be great enough to suppress the inhomogeneous distribution. Light-induced charge distribution in materials can be quantitatively described by the Kukhtarev equations (see, for example, N. V. Kukhtarev et al., "Holographic storage in electrooptic crystals", Ferroelectrics, Vol. 22, pp.949–960, 1979). This well-approximated linear equation system is solvable, so every quantity is predictable according to appropriate experimental data. For illustration of most basic features, assume every quantity is in a steady state. Then, if there exists an accumulated inhomogeneous charge at two neighboring local points inside the material, the charge will create an electric field $E_{int}$ and an electric current j. The charge distribution inhomogeneity is related to the gradient distribution of the illumination field. The formulas from a standard textbook, for example, Saleh and Teich, "Fundamentals of Photonics", p. 730 (1991), result in $$E_{int}(x) = (K_B T/e) \cdot [dI(x)/dx]/I(x) \qquad (4)$$

where $E_{int}$ is the internal local electric field produced by a distribution gradient $dI(x)/dx$ of illumination light field $I(x)$, $K_B$ is the Boltzmann constant, T is temperature, and e is electron charge. When there are two light illumination fields, as in the configuration of FIG. 1 (the incident beam 24 and the suppressing illumination 34), the illumination of the incident beam $I_{inci}(x)$ and the illumination of a suppressing illumination $I_{supr}(x)$ sum as $I(x)=I_{inci}(x)+I_{supr}(x)$. The illumination due to the incident beam $I_{inci}(x)$ may have a certain inevitable nonuniform spatial distribution, so $d[I_{inci}(x)]/dx \neq 0$. On the other hand, the suppressing illumination $I_{supr}(x)$ can be well-controlled so that it has an essentially uniform spatial distribution, so $d[I_{supr}(x)]/dx=0$ and $I_{supr}(x)=I_{supr}=$constant. At the same time, a suppressing illumination can be chosen such that $I_{supr}(x)>>I_{inci}(x)$, Thus, the suppressed internal electric field $E_{supr}$ is $$E_{supr}=(K_B T/e) \cdot (d[I_{inci}(x)]/dx)/(I_{inci}(x)+I_{supr}) \quad (5)$$

For comparison, if $I_{supr}=0$, the internal electric field produced due to illumination by only the deflection beam is $$E_{inci}=(K_B T/e) \cdot (d[I_{inci}(x)]/dx)/I_{inci}(x) \quad (6)$$

Thus, because of the suppressing illumination, the internal electric field is reduced by a factor of $I_{inci}(x)/(I_{inci}(x)+I_{supr})$. The simplified quantitative relationships (4), (5), and (6) are used only for demonstration of some of the most basic features of the process. A more accurate description can be obtained through the solution of the Kukhtarev equations. However, these basic features will remain approximately the same.

The intensity of the suppressing illumination 34 can be larger than that of the incident light beam 24 by a factor of from 2 to a relatively large number, for example, 1,000. Since there is no restriction on the selection of the wavelength, coherence, polarization, and/or collimation of the suppressing illumination 34, the suppressing light source 30 can use low-cost conventional light sources such as light-emitting diodes (LEDs) and incandescent lamps with much higher power than that of the incident beam 24, which typically has a laser source. For example, if the incident beam laser power is between 0.1 mW and 10 mW, a suppressing illumination light intensity of 0.1 W to 10 W can be used. Thus, the optical damage effect, which the prior art presumes to be a severe detriment for light beam deflection, can be reduced by orders of magnitude, and the unfavorable optical damage effects can be essentially eliminated. There are also no restrictions on the spatial and temporal behavior of the suppressing illumination 34. For example, the suppressing light source 30 can move arbitrarily relative to the deflection medium 20 as long as a fast, random relative movement of the suppressing light source 30 can provide additional enhancement of uniformity of its time-averaged illumination.

As indicated above, the suppressing illumination method described with reference to light beam direction control can also be applied to devices for controlling other attributes of light beams. In FIG. 2, suppressing illumination 54 is applied to the device for controlling light beam modulation.

The following is a more detailed list of high sensitivity electrooptic materials that can be used for direct electrooptic devices. With the above-described procedures for suppressing optical damage effects, all electrooptic materials, including electrooptic materials with extraordinarily large electrooptic coefficients and subject to most severe optical damage, can be used to construct direct electrooptic devices. These materials include, but are not limited to, ferroelectric oxides. The first group of ferroelectric oxides includes tungsten bronze family members, such as SBN ($Sr_{1-x}Ba_xNb_2O_6$), BNN ($Ba_2NaNb_5O_{15}$), etc. The second group includes perovskites, such as barium titanate ($BaTiO_3$), potassium niobate ($KNiO_3$), KTN ($KTa_{1-x}Nb_xO_3$), etc. The third group includes ilmenites, such as lithium niobate ($LiNbO_3$), lithium tantalate ($LiTaO_3$), etc.

Note that in prior art, Chen et al. (F. S. Chen et al., "Light Modulation and Beam Deflection with Potassium Tantalate-Niobate Crystals," Journal of Applied Physics, Vol. 37, pp 388–398) discloses the use of the crystal KTN for light beam deflection and modulation. KTN is a high sensitivity electrooptic material. The significant difference between the methods of Chen and those of the present invention is that Chen does not use suppressing light illumination, while in the present invention, the suppressing illumination method is necessary for reducing the effects of optical damages.

Note that U.S. Pat. No. 6,137,601, issued to Khoury et al., discloses a method for using a light source to erase the charge memory effects in a photorefractive material. There are three essential differences between the present invention and the disclosures of Khoury et al. and other similar patents and publications. First, the physical processes are different. In Khoury et al., the suppressing light source is used for a photorefractive process, while in the present invention, the suppressing light source is used in conjunction with the direct electrooptic process. The photorefractive process is essentially different from the direct electrooptic process because for three reasons. First, the photorefractive process deals with a light-light interaction process, while the direct electrooptic process deals with control of light beam attributes through an externally applied electric field. Second, the dimensional scales are substantially different. In the photorefractive process, the dimension of the change of the index of refraction takes place within a size comparable to the size of the wavelength of the light, that is, in a microscopic scale on the order of 1 micrometer ($10^{-3}$ mm), while in the direct electrooptic process, the index of refraction is usually controlled as to be uniformly within the entire macroscopic medium, typically 1 mm or above. Third, the time scales are different. In the photorefractive process, the change of the index of refraction usually takes 1 second or more, while in the direct electrooptic process, the change of the index of refraction usually takes place within microseconds, never more than 1 millisecond. Specifically, in the type of process disclosed by Khoury et al., when the suppressing light source is turned on, the main light beam must be turned off, or vice versa, while in the present invention, the incident light beam and the suppressing illumination must be active simultaneously.

The second difference between Khoury et al. and the present invention is that the technology areas each process serves are essentially different. The objective of the Khoury et al. process is to utilize the inhomogeneous distribution of the index of refraction and to create appropriate patterns of the inhomogeneous distribution of the index of refraction inside a medium to develop photorefractive devices, such as optical memory, optical diffraction grating, etc. On the other hand, the objective of the present invention is to eliminate such nonuniformity of index of retraction in order to ensure that the direct electrooptic process is not affected by such detrimental phenomena.

Finally, the physical implementations are essentially different. The photorefractive process involves an electrodeless electrooptic effect, that is, no electrodes are used to control the medium, while to use the direct electrooptic effect, there must be at least a pair of electrodes.

Thus it has been shown and described a method for employing high sensitivity electrooptic material in dynamically controlling attributes of a light beam.

Since certain changes may be made in the present disclosure without departing from the scope of the present invention, it is intended that all matter described in the foregoing specification and shown in the accompanying drawings be interpreted as illustrative and not in a limiting sense.

I claim:

1. A method for dynamically controlling variation in an attribute of a light beam, said method comprising the steps of:
   (a) providing a transmission medium composed of a high sensitivity electrooptic material transparent to said light beam and having a nonzero electrooptic coefficient, said medium adapted to receive, propagate, and output said light beam;
   (b) appropriately enclosing said medium with at least a pair of electrodes;
   (c) applying a voltage across said electrodes to subject said medium to an electric field;
   (d) controlling said voltage to determine said variation of said attribute;
   (e) illuminating said medium with suppressing illumination simultaneously with said light beam, said suppressing illumination having an intensity sufficient to significantly reduce charge distribution inhomogeneity within said medium.

2. The method of claim 1 wherein said light beam has an intensity and said suppressing illumination intensity is at least ten times said light beam intensity.

3. A device for dynamically controlling variation in an attribute of a light beam, said device comprising:
   (a) a transmission medium composed of a high sensitivity electrooptic material transparent to said light beam and having a nonzero electrooptic coefficient, said medium adapted to receive, propagate, and output said light beam;
   (b) at least a pair of electrodes appropriately enclosing said medium, said electrodes subjecting said medium to an electric field in response to a voltage across said electrodes, the amplitude of said voltage being controlled to determine the amount of said variation of said attribute; and
   (c) a suppressing light source illuminating said medium with suppressing illumination simultaneously with said light beam, said suppressing illumination having an intensity sufficient to significantly reduce charge distribution inhomogeneity within said medium.

4. The method of claim 3 wherein said light beam has an intensity and said suppressing illumination intensity is at least ten times said light beam intensity.

* * * * *